United States Patent
Goldstein (10) Patent No.: US 10,482,520 B2
(45) Date of Patent: Nov. 19, 2019

(54) RECOMMENDING OUTGOING VALUES BASED ON INCOMING VALUES

(71) Applicant: Hipmunk, Inc., San Francisco, CA (US)

(72) Inventor: Adam Julian Goldstein, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 490 days.

(21) Appl. No.: 15/041,223

(22) Filed: Feb. 11, 2016

(65) Prior Publication Data
US 2017/0235748 A1   Aug. 17, 2017

(51) Int. Cl.
*G06Q 30/06* (2012.01)
(52) U.S. Cl.
CPC ................ *G06Q 30/0631* (2013.01)
(58) Field of Classification Search
CPC ........... G06Q 30/0247; G06Q 30/0241; G06Q 30/0251; G06Q 30/0254; G06Q 30/0256; G06F 17/30867; G06F 17/3053; G06F 17/30864; G06F 17/30985
See application file for complete search history.

(56) References Cited

U.S. PATENT DOCUMENTS

| 6,012,045 | A | 1/2000 | Barzilai et al. | |
| 9,479,451 | B1* | 10/2016 | Wertheimer | H04L 47/748 705/35 |
| 2006/0271438 | A1* | 11/2006 | Shotland | G06Q 30/02 705/14.46 |
| 2007/0214044 | A1* | 9/2007 | Lee | G06Q 30/02 705/14.54 |
| 2009/0248585 | A1* | 10/2009 | Hsieh | G06Q 10/02 705/80 |
| 2011/0060646 | A1* | 3/2011 | Park | G06Q 30/02 705/14.46 |
| 2012/0150657 | A1* | 6/2012 | Rubinstein | G06Q 30/02 705/14.66 |
| 2012/0221595 | A1 | 8/2012 | Slowe et al. | |

(Continued)

FOREIGN PATENT DOCUMENTS

| WO | WO-2008127872 A1 | 10/2008 |
| WO | 2017139105 | 8/2017 |

OTHER PUBLICATIONS

"International Application Serial No. PCT/US2017/015179, International Search Report dated Apr. 17, 2017", 2 pgs.

(Continued)

*Primary Examiner* — Yuk Ting Choi
(74) *Attorney, Agent, or Firm* — Schwegman Lundberg & Woessner, P.A.

(57) ABSTRACT

A machine is configured by appropriate software, such as software modules, to function as recommendation machine configured to receive an incoming value from a submitter for an allocable region of a graphical user interface. The allocable region is associated by a first data-structure to a data-string. The recommendation is configured to identify an available correlation of the data-string within a second data-structure, and the recommendation machine is further configured to recommend an outgoing value to be offered by an operator of the machine for the available correlation.

19 Claims, 9 Drawing Sheets

(56) References Cited

U.S. PATENT DOCUMENTS

| | | | |
|---|---|---|---|
| 2013/0282511 A1* | 10/2013 | Mitchell | G06Q 30/0611 |
| | | | 705/26.4 |
| 2014/0129382 A1 | 5/2014 | Huffman et al. | |
| 2014/0222588 A1* | 8/2014 | Ozaki | G06Q 30/02 |
| | | | 705/14.71 |
| 2014/0304088 A1 | 10/2014 | Snyder et al. | |

OTHER PUBLICATIONS

"International Application Serial No. PCT/US2017/015179, Written Opinion dated Apr. 17, 2017", 7 pgs.

* cited by examiner

RECOMMENDING OUTGOING VALUES BASED ON INCOMING VALUES

TECHNICAL FIELD

The subject matter disclosed herein generally relates to the technical field of special-purpose machines configured for data processing by recommending values. Specifically, the present disclosure addresses machines and methods to facilitate recommending an outgoing value based on one or more incoming values.

BACKGROUND

Interactive and on-line advertising provides opportunities for individuals to target content to a receptive audience. For example, the contents of user-inputted search queries are useable to deliver relevant content in conjunction with search results. In this way, web-based search applications permit individuals to identify and define correlations between queries and content within a database of a search engine.

A machine may interact with one or more users by generating or otherwise providing a graphical user interface (GUI) that includes one or more allocable regions. For example, a server machine may generate a GUI, cause display of the GUI to a client machine (e.g., a user device) via one or more networks, and receive values from a third-party source in exchange for display of information from the third-party source within the allocable region. The one or more allocable regions of the GUI may be linked (e.g., hyperlinked) to information available from the server machine or from a different server machine (e.g., a third-party server machine).

BRIEF DESCRIPTION OF THE DRAWINGS

Some example embodiments are illustrated by way of example and not limitation in the figures of the accompanying drawings.

DETAILED DESCRIPTION

Example embodiments are described herein to disclose a recommendation machine, configured to recommend an outgoing value (e.g., a recommended bid value for one auction, expressed as a cost-per-click) based on an incoming value (e.g., a submitted bid value for a different auction) from a third-party source (e.g., third-party server). Examples merely typify possible variations. Unless explicitly stated otherwise, structures (e.g., structural components, such as algorithms and modules) are optional and may be combined or subdivided, and operations (e.g., in a procedure, algorithm or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In various situations, a correlation between items may be defined such that two or more items may be related based on an explicit instruction. For example, in the context of some web-based applications, a correlation can be defined between a hyperlink and an interactive graphical element, such that selection of the interactive graphical element results in navigation to an address of the hyperlink. Or in another context, a search query received from a client device may be correlated to content to be displayed within a GUI of the user device. For example, a user may transmit a search request that includes a set of search terms through a search engine, and in response, the search engine may display a set of search results corresponding to the search terms, as well as content (e.g., advertisements) linked to the search terms within a database of the search engine. One could say that the content is correlated to the search terms. Considering these examples, it is therefore possible to allocate available correlations with data-strings within a database to third-party content (e.g., an identifier of the third-party) to interested third-parties based on bids received from the third-parties. Systems exist which enable individuals to pay a publisher when content is "clicked" by a user. With search engines, entities (e.g., a business entity) may, for example, bid on keywords or phrases relevant to a target market, and pay a fixed "cost-per-click" (CPC). Thus, a system to identify relevant keywords, and calculate an optimal CPC to bid on the relevant keywords, would prove to be an advantage, as bidding too high may guarantee an allocation of the keyword at the cost of overpaying, and bidding too low would result in not receiving the allocation at all.

The example methods and systems described herein are discussed in an example context in which an allocable region of a GUI is an available window or other available region (e.g., a button or a particular position within a dropdown menu), and the correlation is a link within a data-structure between a data-string and an identifier of a machine. The identifier of the machine may include, for example, an interactive graphical element, such as an icon, or other graphical control element. The data-string may, in some example embodiments, be linked to a search query term (e.g., keywords, numerical code, reference to an event) within a database of a search engine via an assignment or mapping relationship. An operator of a machine may offer a value for the available correlation between the data-string and the identifier of the operator of the machine. In some example embodiments, the value may include a CPC. A CPC is the basis of an Internet advertising model used to direct traffic to websites, in which an advertiser (e.g., the operator of the machine) pays a publisher (e.g., a search engine, or host of a website) when the available correlation is accessed (e.g., when the identifier of the operator of the machine is clicked).

In response, the identifier of the machine and the data-string may be linked within the data-structure, such that accessing the data-string results in presentation of the identifier of the operator of the machine. For example, the data-string may include a set of related search terms. In response to receiving a search request that includes the data-string, a search engine may present a set of search results and the identifier of the operator of the machine as an interactive e.g., clickable) graphical element. When a user selects the interactive graphical element (e.g., clicks it), the user may be navigated to additional information, and an account associated with the operator of the machine may transfer the CPC to an account of the search engine.

A machine (e.g., a server computer or server machine) configured by appropriate software (e.g., software modules) to function as a recommendation machine configured to receive a first value (e.g., a bid) from a submitter (e.g., third-party server) for an allocable region of a GUI, wherein the allocable region is associated by a first data-structure (e.g., a database) to a data-string. For example, the submitter may operate a network based service where users may request and book services, such as a particular hotel accommodation or travel option, and the allocable region may be a window within a GUI configured to display such services.

In response to receiving the first value from the submitter, the recommendation machine identifies the data-string associated to the allocable region via the first data-structure. Having identified the data-string, the recommendation engine may then identify an available correlation of the data-string within a second data-structure (e.g., database). The second data-structure may include, for example, a third-party server. The recommendation machine then recommends a second value to be offered by the operator of the machine for the available correlation of the data-string to an identifier of the operator of the machine within the second database. Thus, in some example embodiments, the recommendation machine receives an incoming bid from a submitter accorded to an allocable region of a GUI linked to a data-string and, based on the bid received from the submitter, identifies an available correlation of the data-string and an identifier of an operator of the machine and recommends an outgoing bid value (e.g., a CPC) for the available correlation.

The recommendation machine may also be configured by appropriate software (e.g., software module) to calculate the second value (e.g., the outgoing bid value) to be offered by the operator of the machine for the available correlation, based on the first value (e.g., the incoming bid value) received from the submitter. As noted above, the recommendation machine may receive a first value from a submitter for an allocable region of a GUI, wherein the allocable region is associated by a first data-structure to a data-string. In response to receiving the first value, the recommendation machine identifies the data-string associated with the allocable region and an available correlation with the data-string at a second data-structure, and calculates a second value to be offered for the available correlation based on the first value from the submitter.

In some example embodiments, the recommendation machine accesses a deviation threshold to be applied to values accorded to the allocable region of the GUI. For example, the recommendation machine may receive values from multiple submitters to be accorded to the allocable region of the GUI. The deviation threshold may include a maximum or minimum value to be compared to incoming values received from submitters. The recommendation machine may compare incoming values (e.g., received from submitters for the allocable region) to the deviation threshold, and upon determining that an incoming value transgresses the deviation threshold, the recommendation machine cause a notification (e.g., an alert, display of a graphical element) at a client device to notify a user of the client device of the transgression. For example, the alert may include a notification indicating that an incoming value offered for an allocable region of the GUI is greater than the deviation threshold.

In further example embodiments, the recommendation machine may receive a set of values (e.g., from multiple submitters) for the allocable region of the GUI, calculate an average value of the set of values, and assign the average value to the data-string associated with the allocable region within the first data-structure. Upon receiving a subsequent value accorded to the allocable region from a submitter, the recommendation machine calculates a subsequent average value based on the set of values and the subsequent value in order to calculate a difference between the average value and the subsequent average value. The recommendation machine then updates the second value to be offered for the available correlation of the data-string based on the difference between the average value and the subsequent average value.

Figure 1:
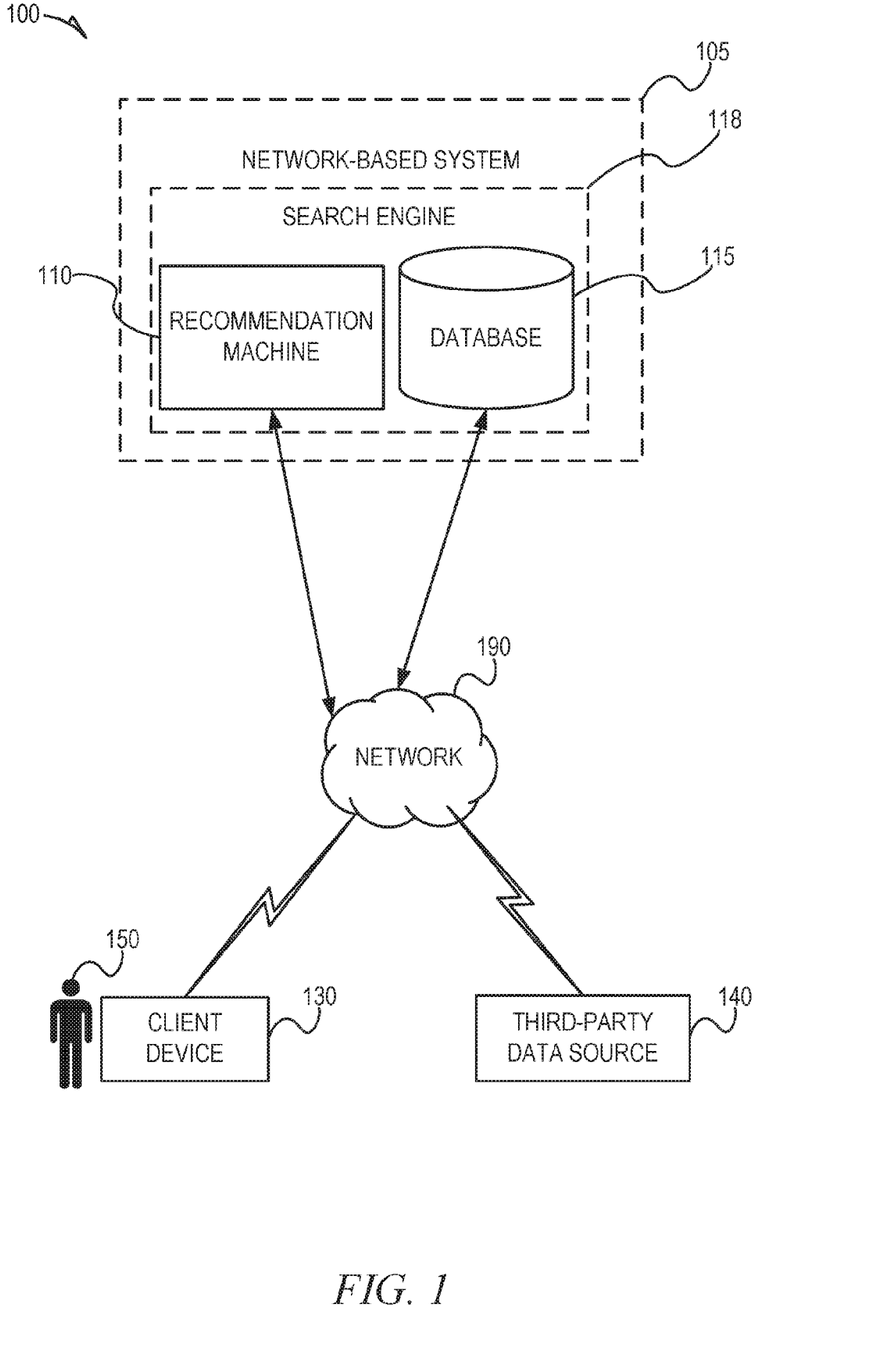
FIG. 1 is a network diagram illustrating a network environment suitable for identifying a correlation and recommending an outgoing value for the correlation based on an incoming value, according to some example embodiments.

FIG. 1 is a network diagram illustrating a network environment 100 suitable for operating a recommendation machine 110, according to some example embodiments. The network environment 100 includes the recommendation machine 110, a database 115, third-party data source 140, and a client device 130 operated by a user 150, all communicatively coupled to each other via a network 190. The recommendation machine 110, with or without the database 115, may form all or part of a search engine 118 (e.g., a travel search engine, a hotel search engine, a shopping search engine, a news search engine, or any suitable combination thereof). In addition, the search engine 118 may form all or part of a network-based system 105 (e.g., a cloud-based server system configured to provide one or more services, such as search engine services, to the client device 130). The third-party data source 140 may be or include a database (e.g., similar to the database 115). In some example embodiments, the third-party data sources 140 are web server machines operated by third parties (e.g., a provider or business entity distinct from the business entity that operates the recommendation machine 110). The recommendation machine 110, the database 115, the third-party data source 140, and the client device 130 may each be implemented in a computer system, in whole or in part, as described below with respect to FIG. 8.

Any of the machines, databases, or devices shown in FIG. 1 may be implemented in a special-purpose computer that has been modified (e.g., configured or programmed) by software (e.g., one or more software modules) to perform one or more of the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 190 may be any network that enables communication between or among machines, databases, and devices (e.g., the recommendation machine 110 and the client device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
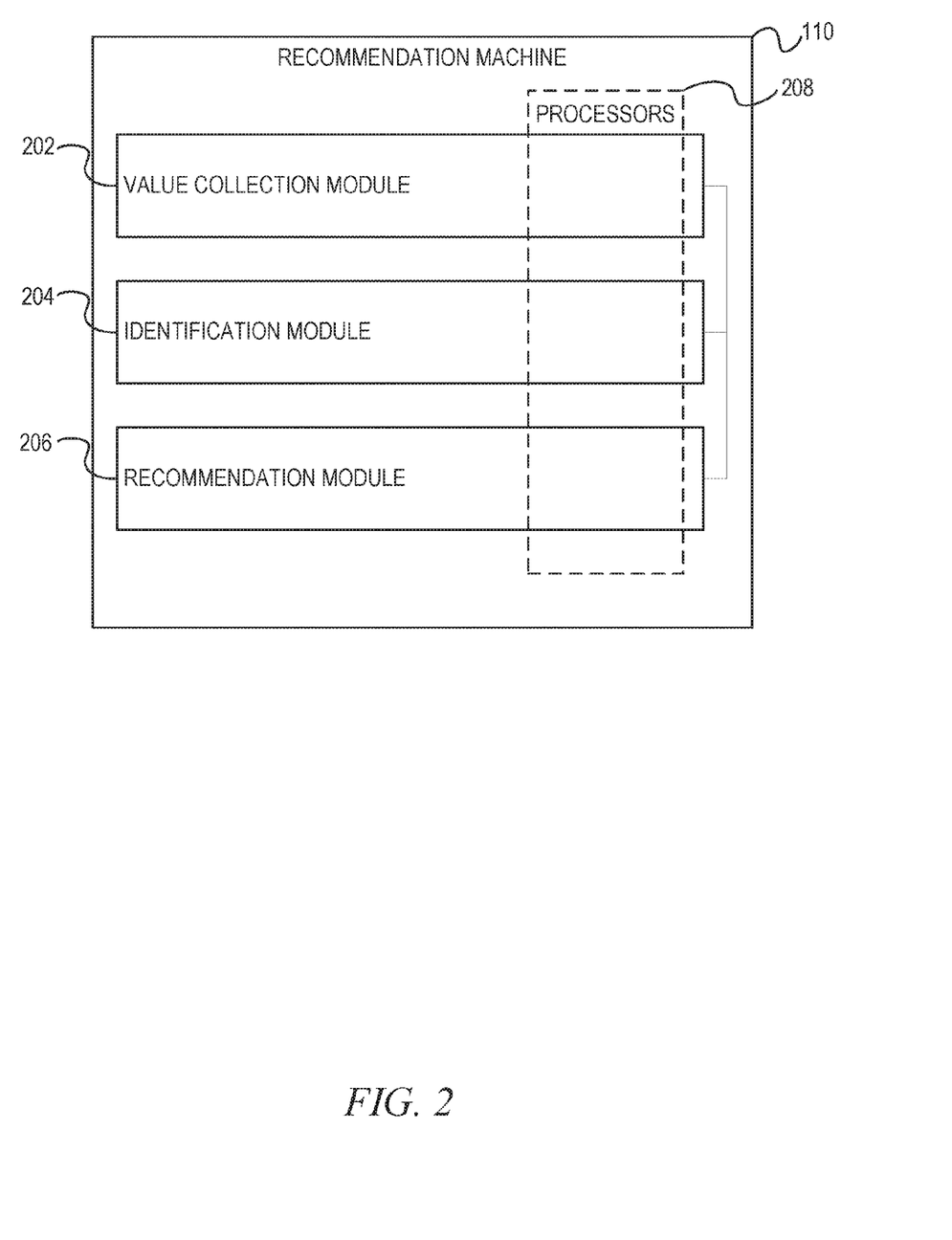
FIG. 2 is a block diagram illustrating components of a recommendation machine suitable for identifying a correlation and recommending an outgoing value for the correlation based on an incoming value, according to some example embodiments.

FIG. 2 is a block diagram illustrating components of the recommendation machine 110 that configure the recommendation machine 110 to receive a first value (e.g., an incoming bid) from a third-party data source 140 (e.g., a submitter) for an allocable region of a GUI, identify a data-string linked to the allocable region via a first data-structure (e.g., database 115), identify an available correlation of the data-string to an identifier of the operator of the machine within a second data-structure, and recommend a second value (e.g., an outgoing bid, a CPC) to be offered by an operator of the machine for the available correlation, according to some example embodiments. The recommendation machine 110 is shown as including a value collection module 202, an identification module 204, and a recommendation module 206, all configured to communicate with each other (e.g., via a bus, shared memory, or a switch). Any one or more of these modules may be implemented using one or more processors 208 (e.g., by configuring such one or more processors to perform functions described for that module) and hence may include one or more of the processors 208.

Any one or more of the modules described may be implemented using hardware alone (e.g., one or more of the processors 208 of a machine) or a combination of hardware and software. For example, any module described of the recommendation machine 110 may physically include an arrangement of one or more of the processors 208 (e.g., a subset of or among the one or more processors of the machine) configured to perform the operations described herein for that module. As another example, any module of the recommendation machine 110 may include software, hardware, or both, that configure an arrangement of one or more processors 208 (e.g., among the one or more processors of the machine) to perform the operations described herein for that module. Accordingly, different modules of the recommendation machine 110 may include and configure different arrangements of such processors 208 or a single arrangement of such processors 208 at different points in time. Moreover, any two or more modules of the recommendation machine 110 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
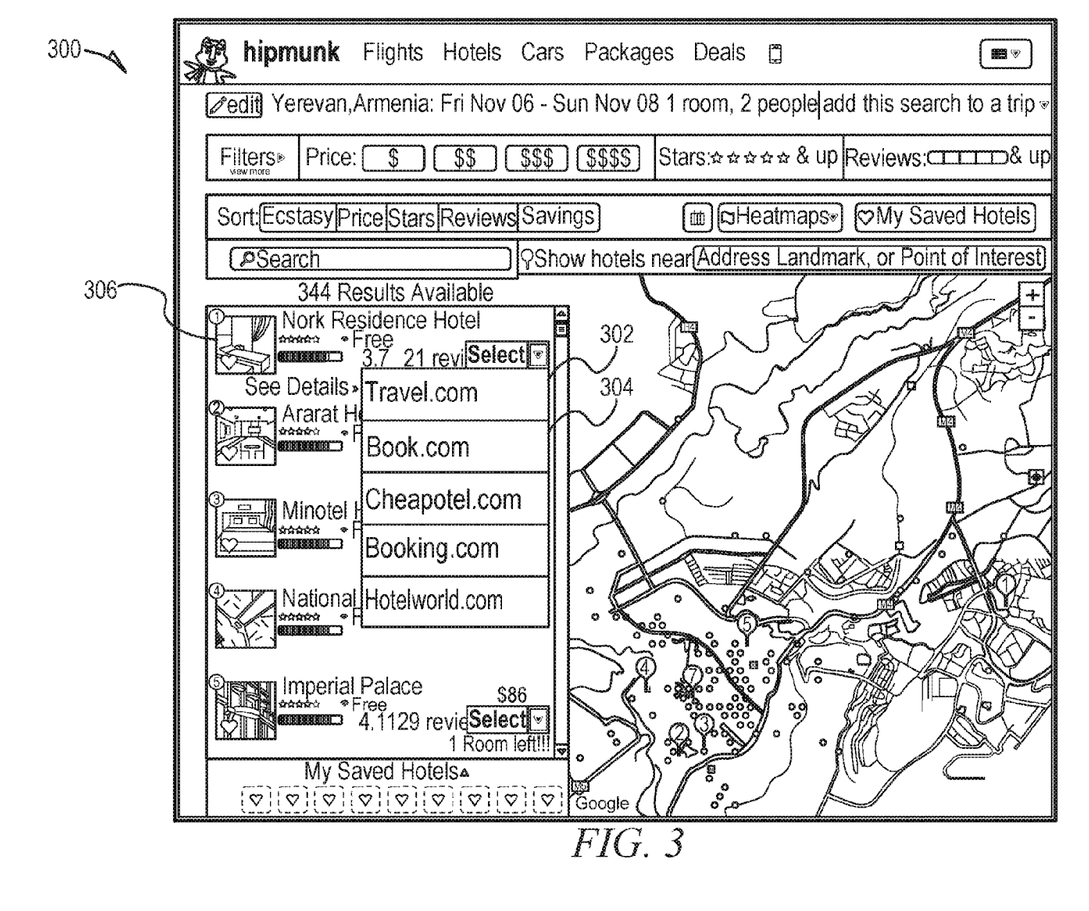
FIG. 3 is a diagram illustrating a GUI including one or more allocable regions, according to some example embodiments.

FIG. 3 is a diagram illustrating a GUI 300 that includes allocable regions 302 and 304, according to some example embodiments. As shown in FIG. 3, the allocable regions 302 and 304 may be linked within a first data-structure (e.g., database 115) to a data-string 306 (e.g., a search query, a name of a hotel, a name of a city, a time-period, a time, a date). The recommendation machine 110 may receive a first value (e.g., an incoming bid) accorded to an allocable region (e.g., allocable region 302, allocable region 304) by a submitter, and in response, cause display of content from the submitter (e.g., a hyperlink to a website of the submitter) within the allocable region. For example, as illustrated in FIG. 3, content of the submitter may include a hyperlink that navigates to a website of the submitter (e.g., Travel.com, Book.com).

Figure 4:
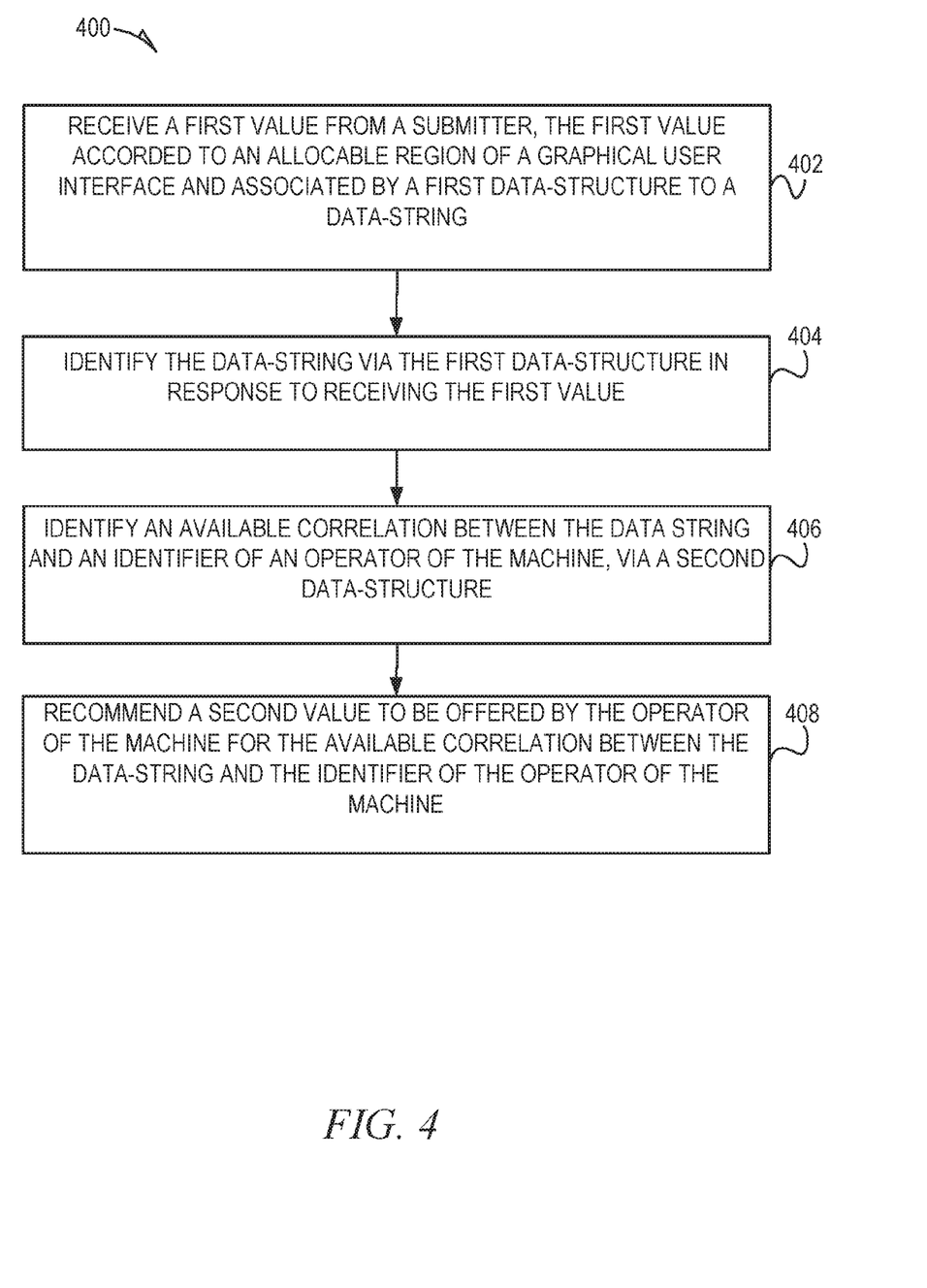
FIG. 4 is a flowchart illustrating operations of the recommendation machine in performing a method of receiving a first value from a submitter and recommending a second value to be offered for an available correlation based on the first value, according to some example embodiments.

FIG. 4 is a flowchart illustrating operations of the recommendation machine 110 in performing a method 400 of receiving a first value (e.g., an incoming bid) accorded by a submitter (e.g., third-party data source 140) to an allocable region, and recommending a second value (e.g., an outgoing bid, a CPC) to be offered for an available correlation based on the first value, according to some example embodiments. As shown in FIG. 4, one or more operations 402, 404, 406, and 408 may be performed as part (e.g., a precursor task, a subroutine, or a portion) of the method 400, according to some example embodiments.

In operation 402, the value collection module 202 of the recommendation machine 110 receives a first value from a submitter (e.g., third-party data source 140), with the first value being offered by the submitter for an allocable region of a GUI (e.g., allocable region 302, allocable region 304), wherein the allocable region is linked via a first data-structure (e.g., database 115) to a data-string. In some example embodiments, the submitter includes a provider of a particular service, such as a travel or accommodations booking provider, and the data-strings associated with the allocable regions of the GUI include references to hotels, cities, events, and dates. For example, the submitter may provide the first value as a bid on the allocable region linked to the data-string in order to display an identifier of the submitter within the allocable region, as seen in FIG. 3.

In operation 404, the identification module 204 identifies the data-string associated with the allocable region in response to receiving the first value from the submitter. In some example embodiments, the data-string is linked to a query term (e.g., a keyword, a set of keywords, a numerical code, a reference to an event) within a database of a search engine. The data-string may be linked to a name of a city (e.g., San Francisco), a numerical code (e.g., an area code such as 415, a zip code such as 94101), and a reference to an event (e.g., "Sting Concert"), In further example embodiments, the identification module 204 identifies the data-string associated with the allocable region via the first data-structure (e.g., database 115). For example, as seen in FIG. 3, the allocable region 302 and 304 may be linked to the data-string 306 (e.g., a name of a hotel) within the database 115. In response to receiving the bid accorded to the allocable region, the identification module 204 accesses the database 115, and based on the connection to the allocable region (e.g., via a pointer), identifies the data-string.

In operation 406, the identification module 2004 identifies an available correlation of the data-string to an identifier of an operator of the machine within a second data-structure. In some example embodiments, the second data-structure is a part of an online advertising platform (e.g., Google AdWords), and the available correlation includes a pointer (e.g., a reference to a memory location) that links the identified data-string (e.g., a search query term) and an identifier of the operator of the machine (e.g., a hyperlink to a website associated with the machine) within the second data-structure. For example, the available correlation of the data-string to the identifier of the operator of the machine may include a search query that includes the data-string and an interactive graphical element. The available correlation may therefore cause display of the interactive graphical element in response to receiving a search query that includes the data-string.

Figure 5:
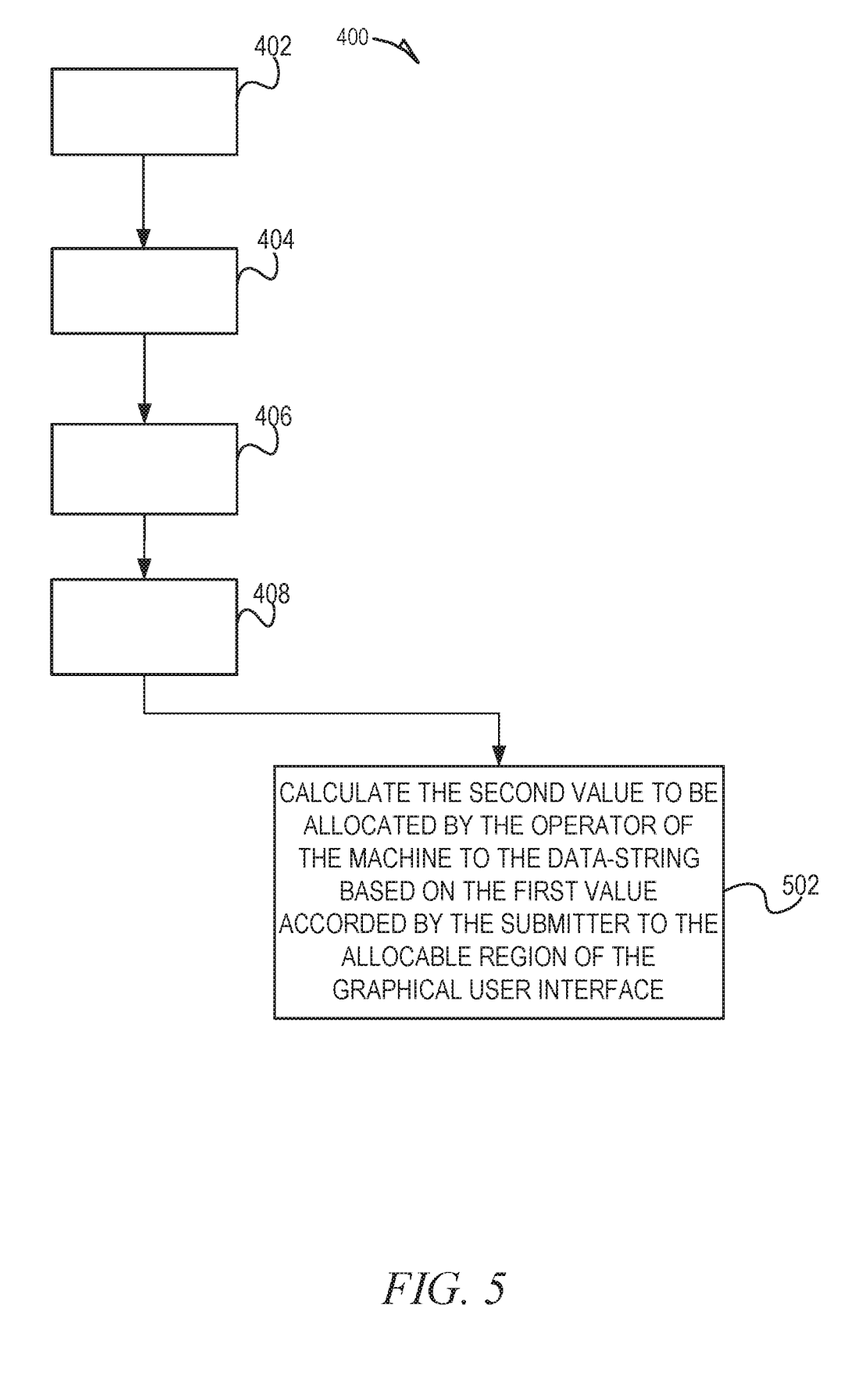
FIG. 5 is a flowchart illustrating operations of the recommendation machine in performing a method of receiving a first value from a submitter and recommending a second value to be offered for an available correlation based on the first value, according to some example embodiments.

In operation 408, the recommendation module 206 recommends a second value to be offered by the operator of the machine for the available correlation between the data-string and the identifier of the operator of the machine. As discussed above, the second value to be offered by the operator of the machine for the available correlation may include a CPC or other similar bid value. In some example embodiments, as depicted in FIG. 5, operation 502 may be performed as part (e.g., a precursor task, a subroutine, or a portion) of operation 408. In operation 502, the recommendation module 206 calculates the second value (e.g., bid value, CPC) based on the first value accorded by the submitter to the allocable region of the GUI.

Figure 6:
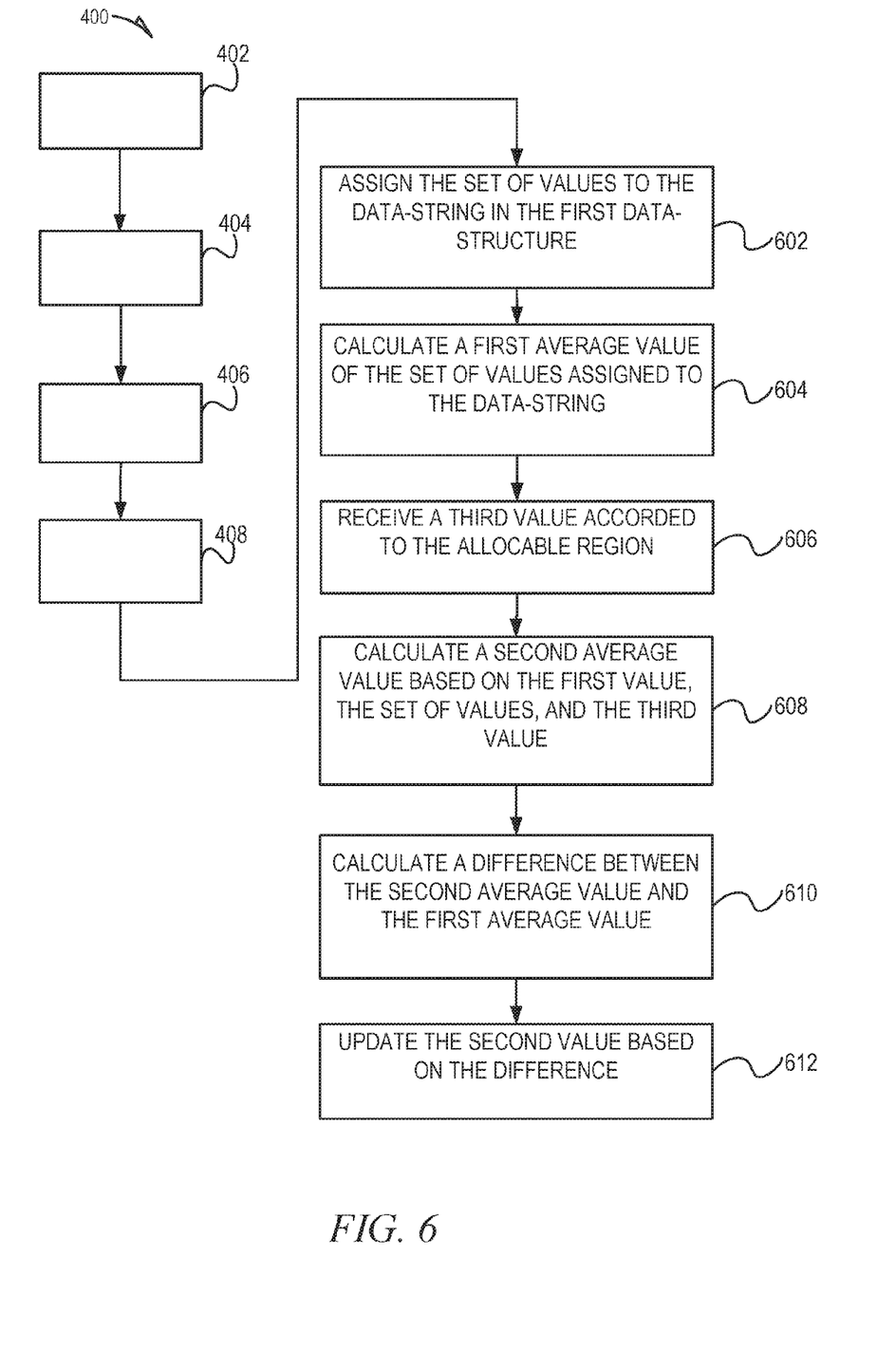
FIG. 6 is a flowchart illustrating operations of the recommendation machine in performing a method of receiving a first value from a submitter and recommending a second value to be offered for an available correlation based on the first value, according to some example embodiments.

FIG. 6 is a flowchart illustrating operations of the recommendation machine 110 in performing the method 400, wherein the first value accorded by the submitter to the allocable region is among a set of values accorded to the allocable region, further including operations for calculating and updating the second value based on at least the first value received by the submitter. As depicted in FIG. 6, operations 602, 604, 606, 608, 610, and 612 may be performed as part (e.g., a precursor task, a subroutine, or a portion) of operation 408 wherein the recommendation module 206 recommends a second value to be offered by the operator of the machine for the available correlation.

In operation 602, the value collection module 202 assigns the set of values and the first value to the data-string within the first data-structure. For example, the value collection module 202 may link the set of values and the first value to the data-string within the first data-structure by creating a reference (e.g., a pointer, a handle) between the data-string and the set of values. In operation 604, the value collection module 202 calculates an average value of the values linked to the data-string (e.g., the set of values and the first value).

In operation 606, the value collection module 202 receives a subsequent value (e.g., a third value) accorded to the allocable region by a submitter. For example, the subsequent value may be a value received from a submitter subsequent (e.g., after) to the set of values and the first value. In response to receiving the subsequent value, in operation 608, the value collection module 202 calculates a subsequent average value (e.g., a second average value) of the set of values, the first value, and the subsequent value.

In operation 610, the value collection module calculates a difference between the subsequent average value (e.g., the second average value) and the first average value. The difference between the values may indicate that the values accorded to the allocable region are increasing or decreasing. In some example embodiments, the recommendation module 206 calculates an updated value for the second value to be offered for the available correlation based on the difference between the first average value and the subsequent average value. In operation 612, the recommendation module 206 updates the second value based on the difference. The updated value based on the difference may be greater than, less than, or equal to the second average value.

In some example embodiments, the determination to increase or decrease the second value by the recommendation module 206 may be based on preloaded configurations. For example, the recommendation module 206 may be configured to update the second value in direct accordance with the difference between the subsequent average value and the first average value, such that the recommendation module 206 recommends to increase the second value when an increase is determined based on the difference, or decrease the second value when a decrease is determined based on the difference. Alternatively, the recommendation module 206 may be configured to update the second value in inverse accordance with the difference between the subsequent average value and the first average value, such that when a decrease is determined based on the difference, the recommendation module 206 recommends to increase the second value, while when an increase is determined, the recommendation module 206 recommends to decrease the second value.

In further example embodiments, the determination to increase or decrease the second value by the recommendation module 206 may be based on the difference between the subsequent average value and the first average value transgressing a deviation threshold. The deviation threshold may designate a maximum or minimum value, or in some embodiments an absolute value, that when transgressed by the difference (or an absolute value of the difference) results in a predefined result. For example, the recommendation module 206 may be configured to recommend an increase of the second value when the difference transgresses the deviation threshold, while otherwise recommending a decrease of the second value absent any transgression.

Figure 7:
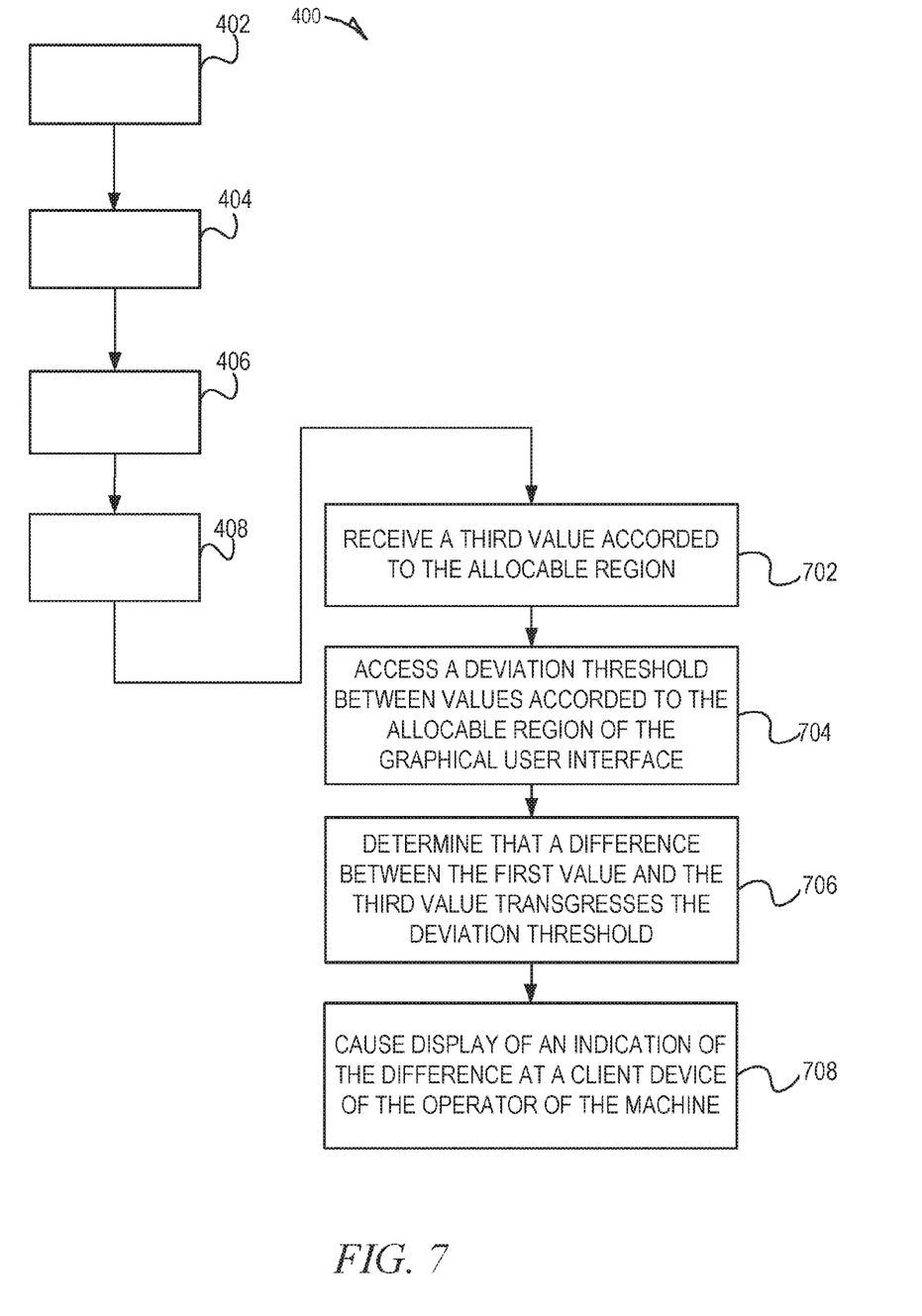
FIG. 7 is a flowchart illustrating operations of the recommendation machine in performing a method of receiving a first value from a submitter and recommending a second value to be offered for an available correlation based on the first value, according to some example embodiments.

FIG. 7 is a flowchart illustrating operations of the recommendation machine 110 in performing the method 400, further including operations for accessing a deviation threshold and causing display of an indication, according to some example embodiments. As depicted in FIG. 7, operations 702, 704, 706, and 708 may be performed as part (e.g., a precursor task, a subroutine, or a portion) of operation 408 wherein the recommendation module 206 recommends a second value to be offered by the operator of the machine for the available correlation.

In operation 702, the value collection module 202 receives a third value accorded to the allocable region by a submitter. For example, the third value may include a bid value from a submitter received by the recommendation machine 110 subsequent to the first value. In response to receiving the third value, in operation 704, the recommendation module 206 accesses a deviation threshold between values accorded to the allocable region of the GUI. In some example embodiments, the deviation threshold may be linked to one or more of the allocable regions of the GUI via the first database (e.g., database 115). The deviation threshold may include a maximum, minimum, or absolute value.

In operation 706, the recommendation module 206 calculates a difference between the third value and the first value, and compares the calculated difference against the deviation threshold. Based on the comparison, the recommendation module 206 may determine that the difference between the third value and the first value transgresses the deviation threshold. For example, the deviation threshold may be an absolute value. If the difference between the third value and the first value is greater than the absolute value of the deviation threshold, then the recommendation module 206 determines that the difference transgressed the deviation threshold.

In operation 708, in response to determining that the difference between the third value and the first value has transgressed the deviation threshold, the recommendation module 206 causes a notification of the transgression at a client device (e.g., client device 130). The notification may include an indication of the difference, as well as an indication of the third value. In some example embodiments, the recommendation module 206 may be configured to notify multiple client devices of the transgression. For example, upon detecting a transgression of the deviation threshold, the recommendation module 206 may notify multiple client devices by causing display of an indication of the difference.

Figure 8:
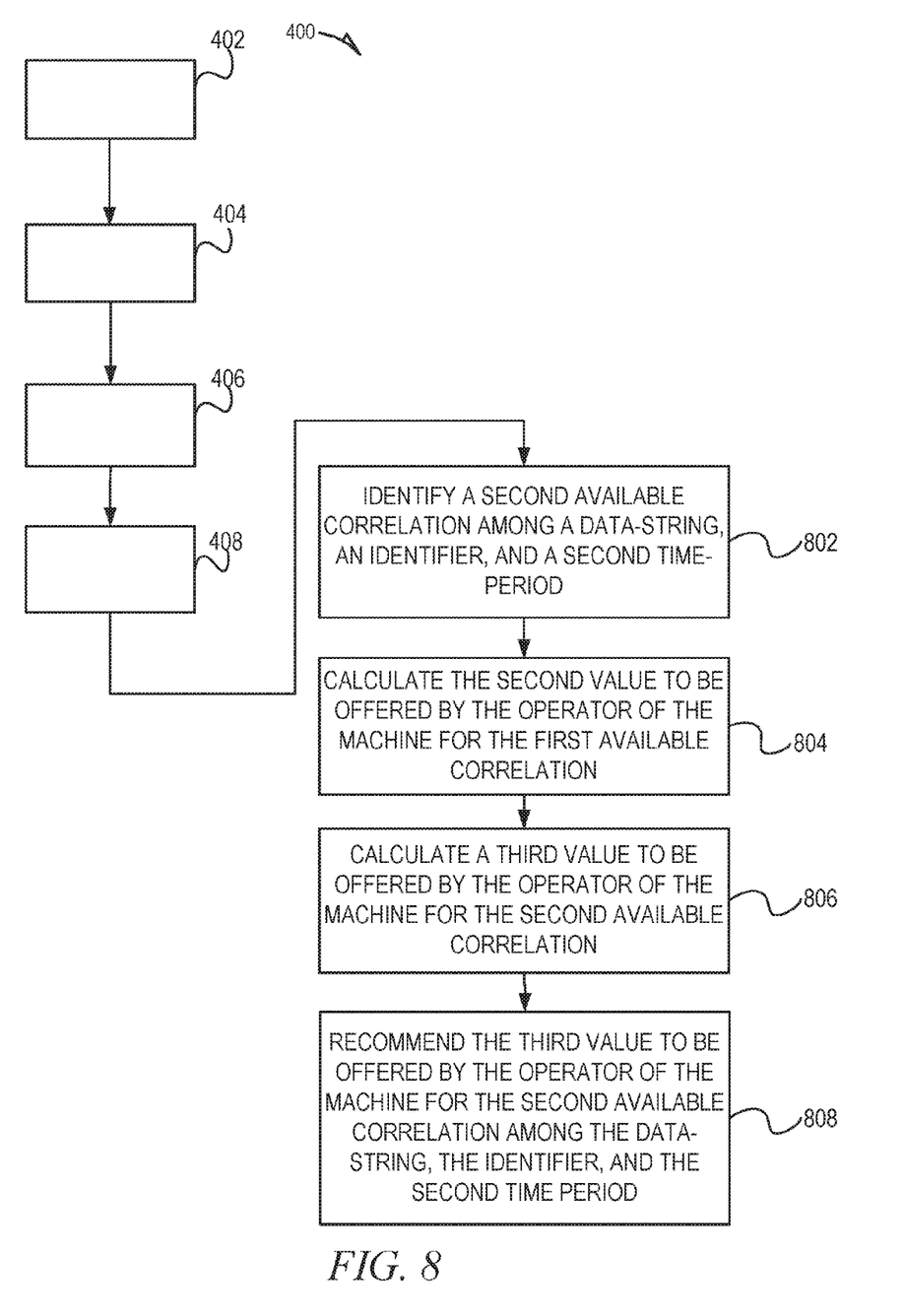
FIG. 8 is a flowchart illustrating operations of the recommendation machine in performing a method of receiving a first value from a submitter and recommending a second value and a third value to be offered for a first available correlation and a second available correlation based on the first value, according to some example embodiments.

FIG. 8 is a flowchart illustrating operations of the recommendation machine 110 in performing the method 400, wherein the available correlation is a first available correlation among a data-string, an identifier of the operator of the machine, and a first time period, further including operations for recommending a value for a second available correlation based on the first value, according to some example embodiments. As depicted in FIG. 8, operations 802, 804, 806, and 808 may be performed as part (e.g., a precursor task, a subroutine, or a portion) of operation 408 wherein the recommendation module 206 recommends a second value to be offered by the operator of the machine for the available correlation.

In operation 802, the identification module 204 identifies a second available correlation among the data-string (of the first available correlation), the identifier of the operator of the machine, and a second time-period. A time-period may include a range of time (e.g., one hour, two hours, a day, a month), as well as a period that begins or ends at the occurrence of a predefined event (e.g., receiving fifty search requests for a data-string) or time and date (e.g., 5:00 PM on January 30).

In operation 804, the recommendation module 206 calculates the second value (e.g., the outgoing bid value for the first available correlation) to be offered by the operator of the machine for the first available correlation, based on the first value (e.g., incoming bid value) received from the submitter and the first time-period. In operation 806, the recommendation module 206 calculates the third value (e.g., the outgoing bid value for the second available correlation), based on the first value (e.g., the incoming bid value) and the second time-period. For example, the recommendation module 206 may be configured to vary the value based on the duration of the time-period, wherein a longer time-period may receive a larger value.

In operation 808, the recommendation module 206 recommends the third value (e.g., the outgoing bid value for the second available correlation). For example, the recommendation module 206 may cause display of the third value at the client device 130.

Figure 9:
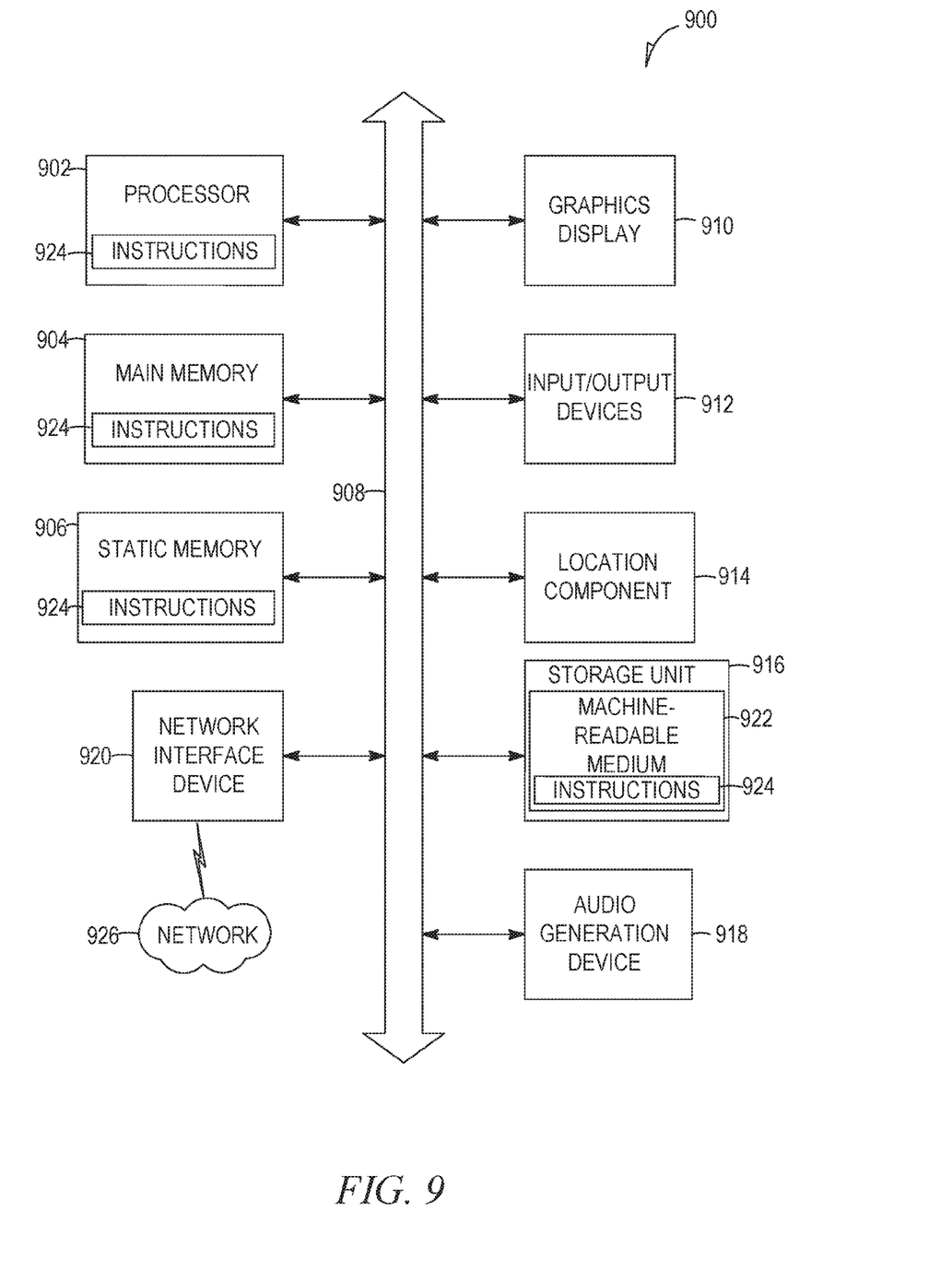
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an apples, an app, or other executable code) for causing the machine 900 to perform any one or more of the methodologies discussed herein may be executed, in whole or in part.

In alternative example embodiments, the machine 900 operates as a standalone device or may be communicatively coupled (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain solid-state digital microcircuits (e.g., electronic, optical, or both) that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein. In some example embodiments, the processor 902 is a multicore CPU (e.g., a dual-core CPU, a quad-core CPU, or a 128-core CPU) within which each of multiple cores is a separate processor that is able to perform any one or more of the methodologies discussed herein, in whole or in part. Although the beneficial effects described herein may be provided by the machine 900 with at least the processor 902, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an input/output device 912 (e.g., a keyboard or keypad, a mouse, a trackpad), a location component 914 (e.g., a global positioning system (GPS) receiver), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media (e.g., tangible and non-transitory machine-readable media). The instructions 924 may be transmitted or received over the network 926 via the network interface device 920. For example, the network interface device 920 may communicate the instructions 924 using any one or more transfer protocols (e.g., hypertext transfer protocol (HTTP)).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 924 for execution by the machine 900 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 924).

Certain example embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In example embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:

receiving, by one or more processors of a machine, a first value from a submitter device, the first value comprising a bid accorded by the submitter device to a first allocable region among a plurality of allocable regions within an interface element presented within a graphical user interface, the first allocable region corresponding with a specific position among the plurality of allocable regions within the interface element presented within the graphical user interface, and the first allocable region being associated by a first data-structure to a data-string;

assigning, by one or more processors of a machine, a set of values that include the first value to the data-string in the first data-structure;

identifying, by one or more processors of the machine, an available correlation between the data-string associated with the first allocable region, and an identifier of the submitter device within a second data-structure;

generating, by one or more processors of the machine, a recommendation to the submitter device that comprises a second value offered for the available correlation between the data-string associated with the first allocable region and the identifier of the submitter device;

receiving, by one or more processors of the machine, a third value accorded to the first allocable region, the third value received subsequent to the first value;

calculating, by one or more processors of the machine, a first average value of the set of values assigned to the data-string, the first average value calculated based on the first value and the set of values;

calculating, by one or more processors of the machine, a second average value based on the first value, the set of values, and the third value, in response to the receiving the third value;

calculating, by one or more processors of the machine, a difference between the second average value and the first average value; and updating, by one or more processors of the machine, the second value of the recommendation based on the average value calculated based on the difference between the second average value and the first average value.

2. The method of claim 1, further comprising:
calculating, by one or more processors of the machine, the second value to be allocated to the data-string based on the first value accorded by the submitter device to the first allocable region at the specific position relative to the plurality of allocable regions of the graphical user interface.

3. The method of claim 1, wherein the method further comprises:
receiving, by one or more processors of the machine, a third value accorded to the first allocable region;
accessing, by one or more processors of the machine, a deviation threshold between values accorded to the first allocable region of the graphical user interface;
determining that a difference between the first value and the third value transgresses the deviation threshold, the determining based on a comparison of the first value and the third value; and
causing display of an indication of the difference at a client device, in response to the determining the difference transgresses the deviation threshold.

4. The method of claim 1, wherein the difference indicates that the second average value represents an increase from the first value, and the method further comprises:
increasing, by one or more processors of the machine, the second value based on the second average value.

5. The method of claim 1, wherein the difference indicates that the second average value represents a decrease from the first value, and the method further comprises:
decreasing, by one or more processors of the machine, the second value based on the second average value.

6. The method of claim 1, wherein the difference indicates that the second average value represents a decrease from the first value, and the method further comprises:
increasing, by one or more processors of the machine, the second value based on the second average value.

7. The method of claim 1, wherein the difference indicates that the second average value represents an increase from the first value, and the method further comprises:
decreasing, by one or more processors of the machine, the second value based on the second average value.

8. The method of claim 1, wherein the first allocable region is within a webpage configured to display a set of search results, the identifier of the operator of the machine is an interactive graphical element, and the method further comprises:
calculating, by one or more processors of the machine, a cost-per-click of the interactive graphical element based on the value, and wherein the recommending recommends the cost-per-click.

9. The method of claim 1, wherein the data-string is linked to a keyword within a database of a search engine by the first data-structure, and the method further comprises:
delivering, by one or more processors of the machine, the second value to the search engine to link the identifier of the submitter device to the keyword within the database of the search engine.

10. The method of claim 1, wherein the data-string is linked to a set of keywords within a database of a search engine by the first data-structure, and the method further comprises:
delivering, by one or more processors of the machine, the second value to the search engine to link the identifier of the submitter device to the set of keywords within the database of the search engine.

11. The method of claim 1, wherein the data-string is linked to a code associated with a geographic area, the code linked to the data-string within a database of a search engine by the first data-structure, and the method further comprises:
delivering, by one or more processors of the machine, the second value to the search engine to link the identifier of the submitter device to the code associated with the geographic area within the database of the search engine.

12. The method of claim 1, wherein the data-string is linked to a reference to an event within a database of a search engine by the first data-structure, and the method further comprises:
delivering, by one or more processors of the machine, the second value to the search engine to link the identifier of the submitter device to the reference to the event within the database of the search engine.

13. The method of claim 1, wherein the available correlation is a first available correlation among the data-string, the identifier of the submitter device, and a first time period, and the method further comprises:
identifying, by one or more processors of the machine, a second available correlation among the data-string, the identifier of the submitter device, and a second time period;
calculating, by one or more processors of the machine, the second value to be offered for the first available correlation based on the first value and the first time period;
calculating, by one or more processors of the machine, a third value to be offered for the second available correlation based on the first value and the second time period; and
recommending, by one or more processors of the machine, the third value to be offered for the second available correlation among the data-string, the identifier of the submitter device, and the second time period.

14. A non-transitory machine-readable storage medium comprising instructions that, when executed by one or more processors of a machine, cause the machine to perform operations comprising:
receiving, by one or more processors of a machine, a first value from a submitter device, the first value comprising a bid accorded by the submitter device to a first allocable region among a plurality of allocable regions within an interface element presented within a graphical user interface, the first allocable region corresponding with a specific position among the plurality of allocable regions within the interface element presented within the graphical user interface, and the first allocable region being associated by a first data-structure to a data-string;
assigning, by one or more processors of a machine, a set of values that include the first value to the data-string in the first data-structure;
identifying, by one or more processors of the machine, an available correlation between the data-string associated with the first allocable region, and an identifier of the submitter device within a second data-structure;
generating, by one or more processors of the machine, a recommendation to the submitter device that comprises a second value offered for the available correlation between the data-string associated with the first allocable region and the identifier of the submitter device;

receiving, by one or more processors of the machine, a third value accorded to the first allocable region, the third value received subsequent to the first value;

calculating, by one or more processors of the machine, a first average value of the set of values assigned to the data-string, the first average value calculated based on the first value and the set of values;

calculating, by one or more processors of the machine, a second average value based on the first value, the set of values, and the third value, in response to the receiving the third value;

calculating, by one or more processors of the machine, a difference between the second average value and the first average value; and updating, by one or more processors of the machine, the second value of the recommendation based on the average value calculated based on the difference between the second average value and the first average value transgresses the deviation threshold, the determining based on a comparison of the first value and the third value; and causing display of an indication of the difference at a client device, in response to the determining the difference transgresses the deviation threshold.

15. The non-transitory machine readable storage medium of claim 14, wherein the instructions cause the machine to perform operations further comprising:

calculating, by one or more processors of the machine, the second value to be allocated to the data-string based on the first value accorded by the submitter device to the first allocable region at the specific position relative to the plurality of allocable regions of the graphical user interface.

16. The non-transitory machine readable storage medium of claim 14, wherein the instructions cause the machine to perform operations further comprising:

receiving, by one or more processors of the machine, a third value accorded to the first allocable region;

accessing, by one or more processors of the machine, a deviation threshold between values accorded to the allocable region of the graphical user interface;

determining that a difference between the first value and the third value transgresses the deviation threshold, the determining based on a comparison of the first value and the third value; and causing display of an indication of the difference at a client device, in response to the determining the difference transgresses the deviation threshold.

17. A system comprising:

processors; and a memory storing instructions that, when executed by at least one processor among the processors, causes the system to perform operations comprising:

receiving, by one or more processors of a machine, a first value from a submitter device, the first value comprising a bid accorded by the submitter device to a first allocable region among a plurality of allocable regions within an interface element presented within a graphical user interface, the first allocable region corresponding with a specific position among the plurality of allocable regions within the interface element presented within the graphical user interface, and the first allocable region being associated by a first data-structure to a data-string;

assigning, by one or more processors of a machine, a set of values that include the first value to the data-string in the first data-structure;

identifying, by one or more processors of the machine, an available correlation between the data-string associated with the first allocable region, and an identifier of the submitter device within a second data-structure;

generating, by one or more processors of the machine, a recommendation to the submitter device that comprises a second value offered for the available correlation between the data-string associated with the first allocable region and the identifier of the submitter device;

receiving, by one or more processors of the machine, a third value accorded to the first allocable region, the third value received subsequent to the first value;

calculating, by one or more processors of the machine, a first average value of the set of values assigned to the data-string, the first average value calculated based on the first value and the set of values;

calculating, by one or more processors of the machine, a second average value based on the first value, the set of values, and the third value, in response to the receiving the third value;

calculating, by one or more processors of the machine, a difference between the second average value and the first average value; and updating, by one or more processors of the machine, the second value of the recommendation based on the average value calculated based on the difference between the second average value and the first average value.

18. The system of claim 17, wherein the instructions cause the system to perform operations further comprising:

calculating, by one or more processors of the machine, the second value to be allocated to the data-string based on the first value accorded by the submitter device to the first allocable region at the specific position relative to the plurality of allocable regions of the graphical user interface.

19. The system of claim 17, wherein the instructions cause the system to perform operations further comprising:

receiving, by one or more processors of the machine, a third value accorded to the first allocable region;

accessing, by one or more processors of the machine, a deviation threshold between values accorded to the allocable region of the graphical user interface;

determining that a difference between the first value and the third value transgresses the deviation threshold, the determining based on a comparison of the first value and the third value; and causing display of an indication of the difference at a client device of the operator of the machine, in response to the determining the difference transgresses the deviation threshold.

* * * * *